March 22, 1955 G. S. BREWER ET AL 2,704,550
PRESSURE REGULATORS
Filed Feb. 13, 1951
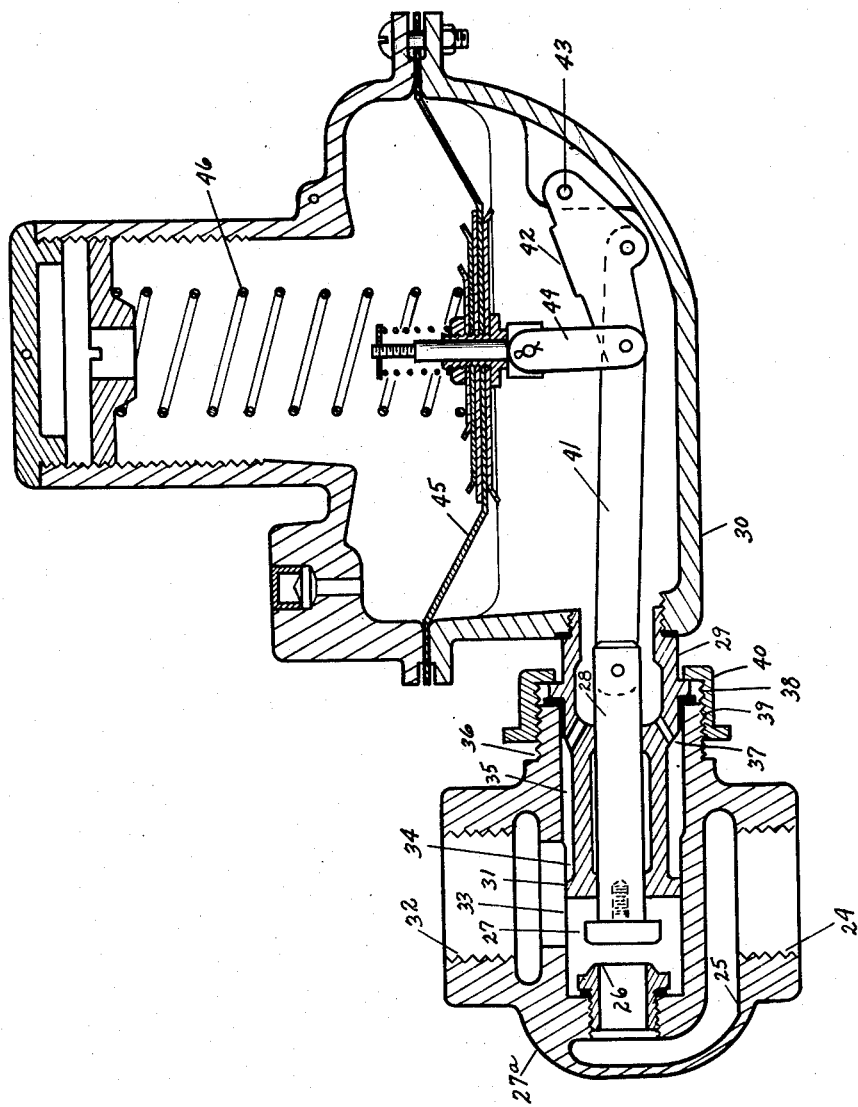
Inventor
George S Brewer
Paul R Dain
By
Ralph Hamner Attorney United States Patent Office 2,704,550
Patented Mar. 22, 1955

2,704,550
PRESSURE REGULATORS

George S. Brewer, Erie, and Paul R. Dain, Meadville, Pa., assignors to American Meter Company, Erie, Pa., a corporation of Delaware Application February 13, 1951, Serial No. 210,762

3 Claims. (Cl. 137—484.4)

In high pressure domestic gas distribution it is necessary that a pressure regulator be installed in each household feeder line to reduce the main pressure to a value suitable for the house piping. Such regulators are frequently called upon to accommodate substantial changes in the main pressure, for example when the distribution main pressure is being increased. Furthermore, the regulators should be capable of installation with a minimum of alteration of existing house piping. This invention is intended to produce such a regulator.

The drawing shows a section through a pressure regulator.

In the regulator the high pressure pressure gas enters an inlet connection 24 and flows through the way 25 to a tubular valve seat 26 threaded into a valve body 27a. The pressure of the gas flowing through the seat is controlled by a poppet valve 27 carried by a stem 28 slidably guided in a tubular projection 29 on housing 30. At the inner end of the tubular projection 29 is a flange or surface 31 which is positioned midway and crosswise of the outlet connection 32 and within the projected area of the outlet connection so as to partly block the same. The gas flowing through the valve seat 26 flows around the valve 27 and into the outlet connection 32 through a restricted passageway 33 over the front or upper edge of the flange 31. The gas flowing over the upper edge of the flange 31 produces a suction or venturi action on a passageway 34 at the back edge of the flange 31. The passageway 34 leads to a cylindrical passageway 35 between the outside of the tubllar projection 29 and the inside of a tubular projection 36 on the valve body 27a. Holes 37 lead through the projection 29 into the interior of the housing 30.

The projections 29 and 36 have surfaces 38, 39 which form a union and are clamped together by a clamping sleeve 40 threaded on the projection 36.

The inner end of the valve stem 28 is pivoted to a toggle drag link 41 pivoted to a toggle link 42 hinged at 43 to the housing 30. The valve 27 is positioned by a link 44 between the link 42 and the underside of a diaphragm 45 clamped to the upper edge of the housing 30. The diaphragm assumes a position determined by the gas pressure on the underside and a spring 46 acting on the upper side. At high rates of flow, the pressure on the underside of the diaphragm is decreased by the venturi action on the passageway 31 so the diaphragm occupies a lower position than it would without the venturi action and accordingly produces a greater opening of the value 27 sufficient to compensate for the drop in pressure due to frictional resistance at the higher flow. This compensation is termed compounding. Without the compensation or compounding the outlet pressure at the outlet connection 32 would drop as the flow increased. By controlling the compounding it is possible to maintain essentially constant pressure at the outlet 32 throughout the entire range of demand.

The regulator comprises two assemblies connected by the coupling sleeve 40, the valve body 27a having the inlet and outlet connections 24 and 32 and the diaphragm housing carrying the tubular projection 29 which telescopes into the valve body and carries the valve 27 and the mechanism for positioning the valve 27 to maintain the desired pressure at the outlet connection. These two assemblies can be mounted in any angular position relative to each other without in any way affecting the operation of the regulator. This is possible because the compounding gas pressure is carried into the diaphragm housing 30 through a tubular passage extending through a union coupling the two parts of the regulator together. This permits installation of the pressure regulator in existing piping with a minimum of alteration. While it is desirable that the housing 30 be installed so that the diaphragm 45 is horizontal, the valve body 27 may be turned to accommodate any angle of the piping from horizontal to vertical. Furthermore, by breaking the pivotal connection 40, the valve body 27a may be installed in the piping and the housing 30 mounted on the installed valve body by tightening the sleeve 40.

What we claim as new is:

1. In a gas pressure regulator, a valve body having opposed inlet and outlet connections for connection between an incoming gas line and the house piping, a valve seat in the body, a way leading from the inlet connection to the valve seat, a poppet valve having its stem extending transverse to the inlet and outlet connections, a housing containing a diaphragm, means including a drag link connecting the diaphragm to the valve stem for positioning the valve stem in accordance with the pressure acting on the diaphragm, a tubular projection extending from the housing, said projection surrounding the link and stem, the inner end of the projection having its front edge positioned within the projected area of the outlet connection and extending transverse to and partly blocking the flow of gas to the outlet connection, a passageway leading from the rear of said edge through said projection into the diaphragm housing and subject to a suction or venturi action modifying the pressure in the diaphragm housing in proportion to the flow of gas, and a union connecting the projection with the valve body, whereby the housing may be swiveled about the valve body.

2. In a gas pressure regulator, a valve body having opposed inlet and outlet connections for connection between an incoming gas line and the house piping, a valve seat in the body, a way leading from the inlet connection to the valve seat, a poppet valve having its stem extending transverse to the inlet and outlet connections, a housing containing a diaphragm, means including a drag link connecting the diaphragm to the valve stem for positioning the valve stem in accordance with the pressure acting on the diaphragm, a tubular projection extending from the housing, said projection surrounding the link and stem, the inner end of the projection being positioned within the projected area of the outlet connection and forming a surface which directs the flow of gas to the outlet connection, a passageway leading from the edge of said surface through said projection into the diaphragm housing and subject to a suction or venturi action modifying the pressure in the diaphragm housing in proportion to the flow of gas, and a union connecting the projection with the valve body, whereby the housing may be swiveled about the valve body.

3. In a gas pressure regulator, a valve body having opposed inlet and outlet connections for connection between an incoming gas line and the house piping, a valve seat in the body, a way leading from the inlet connection to the valve seat, a poppet valve having its stem extending transverse to the inlet and outlet connections, a housing containing a diaphragm, means including a drag link connecting the diaphragm to the valve stem for positioning the valve stem in accordance with the pressure acting on the diaphragm, a tubular projection surrounding the valve stem extending crosswise of the outlet connection and having its front or inner end terminating within the projected area of the outlet connection so the projection partially blocks the flow of gas to the outlet connection, the inner end of the projection having an edge extending transverse to the flow of gas to the outlet connection, and a passageway leading from the rear of said edge and opposite the body of said tubular projection into the diaphragm housing, said passageway being constructed to be subject to suction or venturi action by the flow of gas past said edge to the outlet connection to modify the pressure in the diaphragm housing in proportion to the flow of gas.

References Cited in the file of this patent

UNITED STATES PATENTS

| 1,546,047 | Thrall | July 14, 1925 |
| 1,931,777 | Thrall | Oct. 24, 1933 |
| 2,011,764 | Hughes | Aug. 20, 1935 |
| 2,278,728 | McKinley | Apr. 7, 1942 |
| 2,288,733 | Niesemann | July 7, 1942 |
| 2,351,047 | Hughes | June 13, 1944 |
| 2,435,057 | Temple | Jan. 27, 1948 |
| 2,577,480 | Peterson | Dec. 4, 1951 |

FOREIGN PATENTS

| 523,183 | Germany | 1931 |